United States Patent [19]

Taylor

[11] 4,328,288

[45] May 4, 1982

[54] METHOD FOR IMPROVING STABILITY OF LI/MNO$_2$ CELLS

[75] Inventor: Alwyn H. Taylor, Wellesley Hills, Mass.

[73] Assignee: Duracell International Inc., Bethel, Conn.

[21] Appl. No.: 173,510

[22] Filed: Jul. 25, 1980

[51] Int. Cl.$^3$ ............................................. H01M 4/08
[52] U.S. Cl. ..................................... 429/48; 429/50; 429/194; 429/224
[58] Field of Search .................... 429/194, 224, 48, 50

[56] References Cited

U.S. PATENT DOCUMENTS 4,163,829  8/1979  Kronenberg ........................ 429/194
4,195,122  3/1980  Margalit et al. .................... 429/194
4,264,689  4/1981  Moses ................................. 429/194

FOREIGN PATENT DOCUMENTS 55-80276  6/1980  Japan.

Primary Examiner—Donald L. Walton
Attorney, Agent, or Firm—Ronald S. Cornell; Israel Nissenbaum

[57] ABSTRACT

A method for improving the stability of Li/MnO$_2$ cells having organic electrolytes subject to gaseous decomposition and a manganese dioxide cathode having absorbed water therein in excess of crystalline bound water, with said manganese dioxide and absorbed water causing said gaseous decomposition. Said method comprises the step of predischarging said cell up to 5% of cell capacity prior to extended storage.

19 Claims, No Drawings

METHOD FOR IMPROVING STABILITY OF LI/MNO2 CELLS

This invention specifically relates to Li/MnO2 cells and the fabrication thereof.

The construction of Li/MnO2 cells has required the rigid exclusion of non-crystalline bound water in order for such cells to have an acceptable degree of stability. Thus, in U.S. Pat. No. 4,133,856 issued to Ikeda et al. on Jan. 9, 1979, the manganese dioxide is subjected to several rigorous heat treatment steps prior to its use as a cathode in a non-aqueous lithium cell. Failure to sufficiently heat (200°–350° C. in vacuum) the manganese dioxide after it has been formed into a cathode structure is described in said patent as causing the cell constructed therewith to have lower capacity. Furthermore, the stability of the cell is affected with detrimental gaseous evolution. Though the initial heat treatment of the manganese dioxide drives off substantially all of the non-crystalline bound water, water is reabsorbed by the manganese dioxide during processing and cathode formation. The highly hygroscopic manganese dioxide absorbs water from the atmosphere and, if a pasting cathode construction process is used, from the aqueous carrier. Thus, in order to eliminate such absorption the cathode must be constructed in a dry box with a dry cathode preparation method such as powder pressing. Alternatively, the cathode may be dried by the process described in said Ikeda et al. patent wherein after pressing, there is no further atmospheric exposure. These processing limitations are however unsatisfactory from an economical and manufacturing standpoint. The removal of absorbed water such as by the rigid heat treatment process of Ikeda et al. is also a costly procedure.

It is an object of the present invention to provide a method whereby non-crystalline bound water may be retained in the construction of Li/MnO2 cells without resultant cell instability.

It is a further object of the present invention to provide a method whereby economical cell construction and cathode forming procedures may be used without detrimental effect.

These and other objects, features and advantages will become more evident from the following discussion.

Generally the present invention comprises the predischarging of a Li/MnO2 cell (with non-crystalline bound water in the cathode thereof) up to 5% of cell capacity within a short period of time after construction and before extended storage of the cell. It has been discovered that the problem of cell instability with gaseous evolution, contrary to what was previously believed, is independent of the cell anode reactivity characteristics. "Cells" constructed without anodes still gas and are unstable. Cells constructed with lithium anodes but without cathodes or with cathode materials such as mercuric oxide, mercury (II) sulfate or lead dioxide under conditions which cause instability in cells having MnO2 cathodes are stable despite the presence of water therein. The instability found in cells having MnO2 cathodes with non-crystalline bound water is therefore attributable to the gaseous decomposition of the organic electrolytes which is catalyzed by the combination of MnO2 and water. Such catalytic nature of the MnO2 is engendered by even small amounts of water (as little as 0.003%) thereby providing an explanation for the rigorous heating (above 200° C.) required by Ikeda et al. Extended storage of the cells permits the decomposition of the organic electrolytes to proceed apace with resultant loss of cell capacity, internal pressure with the likelihood of leakage, and increased cell polarization. This problem is further exacerbated by storage at elevated temperatures whereby the decomposition reaction is accelerated. It is postulated that the predischarge has the effect of reducing the absorbed water in the manganese dioxide cathode with the catalytic decomposition of the organic electrolyte being thereby eliminated since the dehydrated (except for crystalline bound water) MnO2 is not catalytic. The water reducing reaction is believed to be:

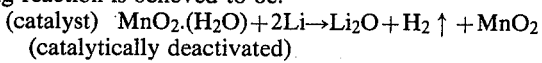

(catalyst) MnO2.(H2O)+2Li→Li2O+H2 ↑ +MnO2
(catalytically deactivated)

Though such water reduction results in observed hydrogen gas evolution such gas evolution is relatively minor in comparison to the continuous catalyzed gaseous organic electrolyte decomposition. The cell can therefore tolerate such hydrogen gas evolution without significant ill effect. It is, however, understood that a wet MnO2 (more than 1% by weight of non-crystalline bound water) cathode should generally not be used in the completed cell since a greater percentage of cell discharge may be required for the water reduction thereby both reducing cell capacity significantly and causing the evolution of detrimental amounts of hydrogen gas. It is accordingly preferred that non-rigorous treatment, such as low temperature drying and strong liquid expression, of the manganese dioxide cathode be effected prior to use thereof in the finished cell. Such non-rigorous treatments are generally applicable to MnO2 cathodes particularly those produced by pasting methods using aqueous carriers and also to dry method cathodes made in moist air.

Solvents which are susceptible to gaseous decomposition include, particularly, propylene carbonate (which together with dimethoxyethane is commonly used in Li/MnO2 cells), and dimethyl sulfoxide. The electrolyte salt commonly utilized in Li/MnO2 cells is lithium perchlorate with examples of other salts including LiAsF6 and LiCF3CO2. The predischarging of the present invention is also effective in further stabilizing cells having even the more stable solvents and salts described in co-pending United States application No. 070,198 filed Aug. 27, 1979. The solvents described therein include dioxolane, gamma-butyrolactone and diglyme. Stable salts described therein include LiPF6, LiCF3SO3 and LiBF4. Though such solvents and salts reduce the amount of gaseous decomposition, there remains some residual decomposition which the predischarge of the present invention further alleviates.

The manganese dioxide utilized in the cathodes of the Li/MnO2 cells is preferably the substantially beta form, however, the present invention is equally applicable to manganese dioxide in other forms such as rho, gamma or gamma-beta and the like, all of which become catalytic with absorbed water.

Since the catalyzed decomposition of the organic electrolyte is independent of the anode material, the present invention is applicable to nonaqueous cells having any anode material. However, because of energy density considerations it is preferred that the anode be selected from the alkali or alkaline earth metals and aluminum, with lithium, because of its highest energy density, being the most preferred anode material.

The predischarge may be accomplished electrically by short circuiting the cell for a short period of time or by placing the cell under an external load. Generally, a predischarge of up to about 2 to 5% of cell capacity is sufficient to impart the requisite stability and such percentage discharge is preferred. A predischarge greater than 5% generally reduces the capacity of the cell with little discernible benefit since the presence of significant amounts of water requiring the greater amounts of discharge, will evolve possibly detrimental amounts of hydrogen gas.

At ambient temperature storage the gassing reactions are relatively complete after about four weeks with more than 50% of the gassing reactions being completed after the first week. Elevated storage temperatures accelerate the gassing reactions. It is therefore generally preferred that the predischarge of the cells be effected as soon as practicable (within a day) after cell construction to preclude any significant gas evolution and pressure build up in what is essentially a non-pressurized cell system (Li/MnO$_2$). If the cells are to be stored at ambient temperatures the predischarge should be effected within the above mentioned four week period and within effectively equivalent periods of reaction and gassing based upon either high temperature storage with accelerated gassing or low temperature storage with decelerated gassing. Since the gassing reactions are generally more than 50% completed after the first week of ambient temperature storage it is more preferred that the predischarge be effected within the first week after construction of cells to be stored at ambient temperature conditions with effectively equivalent periods for high temperature storage (a period less than 1 week) or low temperature storage (a period greater than 1 week). The effectively equivalent period for preferred discharge of high temperature stored cells may, however, be even shorter than a simple equivalent period since the rapidity of gas generation under the high temperature storage conditions may adversely affect cell components particularly the cathode with resultant degraded cell performance. Because of variations of detrimental storage times under differing storage temperatures, storage times described herein refer to ambient room temperature (20°–25° C.) storage unless otherwise specifically indicated.

As an indication of the marked effectiveness of the present invention in stabilizing cells having MnO$_2$ cathodes with retained non-crystalline bound water the following examples are presented. It is understood that the examples are for illustrative purposes only with specific enumeration of detail not to be construed as limitations on the present invention. Unless otherwise indicated all parts are parts by weight.

EXAMPLE 1 (Non Predischarged)

A flat button cell (0.1" (0.25 cm) height by 1" (2.54 cm) diameter) is constructed containing a lithium foil disk weighing 70 mg, a non-woven polypropylene disk separator and a cathode disk pressed from 1 gram of a mixture of 90% beta MnO$_2$, 6% graphite and 4% polytetrafluoroethylene powder. The electrolyte is about 275 mg of a 1 M LiClO$_4$ in a 1:1 equivolume mixture propylene carbonate-dimethoxyethane solution. Prior to assembly, within the cell, the pressed cathode disk is heated for 1 hour in air at 300° C. The cell is thereafter heated to 108° C. for 3.5 hours and brought to room temperature with a cell expansion of 30 mils (0.8 mm), a cell expansion of about 30%.

EXAMPLE 2 (Predischarged)

A cell identical to the cell of Example 1 is predischarged prior to heating thereof at 108° C. for 3.5 hours and cooling to room temperature. The predischarged amount is about 3% of cell capacity with the cell expanding by 5 mils (0.13 mm), a cell expansion of about 5%.

It is understood that the above examples are for illustrative purposes only with changes in cell structures and components and the like being possible without departing from the scope of the present invention as defined in the following claims. Thus for example though the cell gassing has been specifically described as being dimensionally detrimental with respect to flat button cells, such gassing may be equally detrimental to large cylindrical cells in the form of leakage, reduced discharge rate capability and the like.

What is claimed is:

1. A method for improving the stability of a non-aqueous cell containing an anode comprised of a metal selected from the group consisting of alkali metals, alkaline earth metals and aluminum, said cell further containing a catalytically active manganese dioxide cathode having absorbed water therein in excess of crystalline bound water and an organic electrolyte subject to detrimental gaseous decomposition catalyzed by said manganese dioxide with absorbed water, wherein said gaseous decomposition normally results during the initial extended storage of said cell; said method comprising the step of predischarging said cell prior to said initial storage whereby said absorbed water is reduced such that said manganese dioxide is deactivated as a catalyst with substantially reduced gaseous decomposition of said organic electrolyte.

2. The method of claim 1 wherein said absorbed water comprises up to 1% by weight of said manganese dioxide.

3. The method of claim 1 wherein said anode is comprised of lithium.

4. The method of claim 1 wherein said cell is predischarged up to 5% of the initial cell capacity.

5. The method of claim 4 wherein said cell is predischarged up to 2% of the initial cell capacity.

6. The method of claim 4 wherein said cell is predischarged by short circuiting said anode and cathode.

7. The method of claim 4 wherein said cell is predischarged by placing said cell under an electrical load.

8. The method of claim 1 wherein said extended storage is four weeks.

9. The method of claim 8 wherein said extended storage is one week.

10. The method of claim 9 wherein said extended storage is one day.

11. The method of claim 1 wherein said manganese dioxide is substantially beta manganese dioxide.

12. The method of claim 1 wherein said organic electrolyte contains an electrolyte salt selected from the group consisting of LiPF$_6$, LiCF$_3$SO$_3$ and LiBF$_4$.

13. A method for improving the stability of a non-aqueous cell comprising a lithium anode, a catalytically active manganese dioxide cathode with absorbed water therein in excess of crystalline bound water, and an organic electrolyte comprised of a lithium perchlorate dissolved in a mixture of propylene carbonate and dimethoxyethane, said method comprising predischarging said cell up to 5% of initial cell capacity prior to an initial storage period of one week.

14. The method of claim 13 wherein said initial storage period is one day.

15. The method of claim 14 wherein said cell is pre-discharged up to 2% of initial cell capacity.

16. The method of claim 13 wherein said manganese dioxide is substantially beta manganese dioxide.

17. The method of claim 16 wherein said cell is pre-discharged by placing it under an electrical load.

18. The method of claim 16 wherein said cell is pre-discharged by short circuiting said anode and cathode.

19. The method of claim 17 wherein said cathode is comprised of pasted manganese dioxide.

* * * * *